United States Patent
Zenor

(10) Patent No.: US 11,184,658 B2
(45) Date of Patent: Nov. 23, 2021

(54) SYSTEMS AND METHODS TO SELECT TARGETED ADVERTISING

(71) Applicant: The Nielsen Company (US), LLC, New York, NY (US)

(72) Inventor: Michael John Zenor, Cedar Park, TX (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/428,397

(22) Filed: May 31, 2019

(65) Prior Publication Data

US 2019/0289352 A1 Sep. 19, 2019

Related U.S. Application Data

(63) Continuation of application No. 15/990,341, filed on May 25, 2018, now Pat. No. 10,469,890, which is a (Continued)

(51) Int. Cl.
*H04N 21/2668* (2011.01)
*H04N 21/81* (2011.01)
(Continued)

(52) U.S. Cl.
CPC ......... *H04N 21/2668* (2013.01); *G06Q 30/02* (2013.01); *G06Q 30/0242* (2013.01);
(Continued)

(58) Field of Classification Search
CPC ........... H04N 21/2405; H04N 21/4524; H04N 21/2668; H04N 21/252; H04N 21/25883;
(Continued)

(56) References Cited

U.S. PATENT DOCUMENTS 5,515,098 A 5/1996 Carles
5,754,939 A 5/1998 Herz et al.
(Continued)

OTHER PUBLICATIONS

IP Australia, "Patent Examination Report No. 1," mailed in connection with Australian Patent Application No. 2013203737, dated Oct. 16, 2014, 3 pages.
(Continued)

*Primary Examiner* — Alfonso Castro
(74) *Attorney, Agent, or Firm* — Hanley, Flight & Zimmerman, LLC

(57) ABSTRACT

Systems and methods to select targeted advertising for display are disclosed. Example systems disclosed herein are to access an address of a media device associated with a household, access purchase data reported from a logging device that logs product purchase activity at the household, determine a consumer segment associated with the household, determine an opportunity metric for a first product to be purchased by the household based on the purchase data reported from the logging device and purchase behavior associated with the consumer segment, select a first advertisement associated with the first product to deliver to the media device based on the opportunity metric and a saturation metric associated with the household for the first advertisement, the saturation metric based on detection of codes embedded in prior instances of the first advertisement delivered to the media device, and transmit the first advertisement to the address of the media device.

21 Claims, 11 Drawing Sheets

Related U.S. Application Data continuation of application No. 12/964,481, filed on Dec. 9, 2010, now Pat. No. 9,986,277.

(60) Provisional application No. 61/355,882, filed on Jun. 17, 2010.

(51) Int. Cl.
*G06Q 30/02* (2012.01)
*H04N 21/25* (2011.01)
*H04N 21/258* (2011.01)

(52) U.S. Cl.
CPC ..... *H04N 21/252* (2013.01); *H04N 21/25883* (2013.01); *H04N 21/812* (2013.01)

(58) Field of Classification Search
CPC .............. H04N 21/812; G06F 17/3087; H04L 29/08657; G06Q 30/02; G06Q 30/0242
USPC .......................................................... 725/34
See application file for complete search history.

(56) References Cited

U.S. PATENT DOCUMENTS

| | | | |
|---|---|---|---|
| 5,774,170 A * | 6/1998 | Hite .................. | G06Q 30/02 348/E7.036 |
| 5,842,199 A | 11/1998 | Miller et al. | |
| 5,983,220 A | 11/1999 | Schmitt | |
| 6,216,129 B1 | 4/2001 | Eldering | |
| 6,430,539 B1 | 8/2002 | Lazarus et al. | |
| 6,457,010 B1 | 9/2002 | Eldering et al. | |
| 6,463,585 B1 | 10/2002 | Hendricks et al. | |
| 6,571,279 B1 | 5/2003 | Herz et al. | |
| 6,718,551 B1 | 4/2004 | Swix et al. | |
| 6,839,682 B1 | 1/2005 | Blume et al. | |
| 7,134,132 B1 | 11/2006 | Ngo et al. | |
| 7,165,037 B2 | 1/2007 | Lazarus et al. | |
| 7,403,910 B1 | 7/2008 | Hastings et al. | |
| 7,406,436 B1 | 7/2008 | Reisman | |
| 7,533,038 B2 | 5/2009 | Blume et al. | |
| 8,676,644 B2 * | 3/2014 | Merriman ........... | G06Q 30/0257 705/14.4 |
| 2001/0032333 A1 | 10/2001 | Flickinger | |
| 2002/0010620 A1 | 1/2002 | Kowalchuk et al. | |
| 2002/0042914 A1 * | 4/2002 | Walker ................... | G06Q 30/02 725/36 |
| 2003/0177059 A1 | 9/2003 | Smorenburg et al. | |
| 2003/0229542 A1 * | 12/2003 | Morrisroe .......... | G06Q 30/0242 705/14.41 |
| 2004/0054572 A1 | 3/2004 | Oldale et al. | |
| 2005/0028188 A1 * | 2/2005 | Latona ................... | G06Q 30/02 725/13 |
| 2005/0209919 A1 | 9/2005 | Stubbs et al. | |
| 2006/0230053 A1 * | 10/2006 | Eldering ................ | G06Q 30/02 |
| 2006/0293948 A1 * | 12/2006 | Weinblatt ............... | G06Q 30/02 705/14.25 |
| 2007/0038567 A1 | 2/2007 | Allaire et al. | |
| 2007/0038931 A1 | 2/2007 | Allaire et al. | |
| 2007/0198327 A1 | 8/2007 | Yazdani et al. | |
| 2007/0255690 A1 | 11/2007 | Chang et al. | |
| 2007/0294721 A1 * | 12/2007 | Haeuser ............. | H04N 7/17318 725/34 |
| 2008/0015877 A1 | 1/2008 | McKenna et al. | |
| 2008/0033810 A1 | 2/2008 | Chu | |
| 2008/0040666 A1 * | 2/2008 | Wang .................... | H04L 67/306 715/210 |
| 2008/0294996 A1 * | 11/2008 | Hunt ..................... | G06Q 30/02 715/739 |
| 2009/0271256 A1 * | 10/2009 | Toebes .................. | G06Q 30/02 705/14.53 |
| 2009/0307061 A1 | 12/2009 | Monighetti et al. | |
| 2010/0161492 A1 | 6/2010 | Harvey et al. | |
| 2010/0293031 A1 * | 11/2010 | Jacobs ................. | G06Q 10/087 705/14.4 |
| 2012/0089996 A1 | 4/2012 | Ramer et al. | |
| 2013/0013396 A1 | 1/2013 | Vinson et al. | |
| 2018/0278980 A1 | 9/2018 | Zenor | |

OTHER PUBLICATIONS

IP Australia, "Patent Examination Report No. 2," mailed in connection with Australian Patent Application No. 2013203737, dated Nov. 11, 2014, 3 pages.

Canadian Intellectual Property Office, "Examination Report," mailed in connection with Canadian Patent Application No. 2,743,693, dated Jul. 25, 2013, 2 pages.

IP Australia, "Patent Examination Report No. 2," mailed in connection with Australian Patent Application No. 2011202879, dated Feb. 28, 2013, 2 pages.

IP Australia, "Patent Examination Report No. 1," mailed in connection with Australian Patent Application No. 2011202879, dated Jul. 26, 2012, 3 pages.

United States Patent and Trademark Office, "Notice of Allowance," mailed in connection with U.S. Appl. No. 12/964,481, dated Jan. 29, 2018, 12 pages.

United States Patent and Trademark Office, "Examiner's Answer to Appeal Brief," mailed in connection with U.S. Appl. No. 12/964,481, dated Aug. 12, 2016, 21 pages.

United States Patent and Trademark Office, "Final Office Action," mailed in connection with U.S. Appl. No. 12/964,481, dated Oct. 2015, 18 pages.

United States Patent and Trademark Office, "Non-final Office Action," mailed in connection with U.S. Appl. No. 12/964,481, dated Mar. 24, 2015, 16 pages.

United States Patent and Trademark Office, "Final Office Action," mailed in connection with U.S. Appl. No. 12/964,481, dated Aug. 28, 2014, 6 pages.

United States Patent and Trademark Office, "Non-final Office Action," mailed in connection with U.S. Appl. No. 12/964,481, dated Nov. 8, 2013, 19 pages.

United States Patent and Trademark Office, "Non-final Office Action," mailed in connection with U.S. Appl. No. 12/964,481, dated Jun. 21, 2012, 13 pages.

United States Patent and Trademark Office, "Final Office Action," mailed in connection with U.S. Appl. No. 12/964,481, dated Dec. 20, 2012, 19 pages.

United States Patent and Trademark Office, "Final Office Action," mailed in connection with U.S. Appl. No. 15/990,341, dated Feb. 15, 2019, 18 pages.

United States Patent and Trademark Office, "Non-final Office Action," mailed in connection with U.S. Appl. No. 15/990,341, dated Aug. 27, 2018, 25 pages.

United States Patent and Trademark Office, "Advisory Action," mailed in connection with U.S. Appl. No. 12/964,481, dated Dec. 12, 2014, 3 pages.

United States Patent and Trademark Office, "Notice of Allowance," mailed in connection with U.S. Appl. No. 15/990,341, dated Jun. 27, 2019, 13 pages.

United States Patent and Trademark Office, "Advisory Action," mailed in connection with U.S. Appl. No. 15/990,341, dated Jun. 27, 2019, 4 pages.

\* cited by examiner

400

EXPECTED WEEKLY PURCHASES BY SEGMENT

| Segment | Beer Z (12 Fl. Oz) | Chips B (1 Oz) | Bread H (16 Oz) | Bread J (16 Oz) | Milk M (8 Fl. Oz) |
|---|---|---|---|---|---|
| N | 12 | 6 | 1 | 1 | 16 |
| Q | 12 | 8 | 1 | 1 | 32 |
| R | 18 | 10 | 2 | 1 | 16 |
| S | 6 | 12 | 2 | 2 | 8 |
| T | 12 | 6 | 1 | 1 | 16 |

WEEKLY HOUSEHOLD PURCHASES BY PRODUCT

| Weekly Purchases, Units | Household 1 | Household 2 | Household 3 | Household 4 | Household 5 |
|---|---|---|---|---|---|
| Beer X (12 Fl. Oz) | 12 | 0 | 0 | 0 | 2 |
| Beer Y (12 Fl. Oz) | 0 | 1 | 6 | 0 | 2 |
| Beer Z (12 Fl. Oz) | 0 | 1 | 6 | 0 | 2 |
| Chips A (1 Oz) | 0 | 0 | 0 | 10 | 0 |
| Chips B (1 Oz) | 0 | 6 | 6 | 3 | 0 |
| Chips C (1 Oz) | 0 | 0 | 6 | 0 | 16 |
| Bread H (16 Oz) | 1 | 1 | 0 | 0 | 0 |
| Bread I (16 Oz) | 0 | 0 | 0 | 0 | 1 |
| Bread J (16 Oz) | 0 | 0 | 1 | 0 | 1 |
| Milk M (8 Fl. Oz) | 8 | 16 | 0 | 0 | 8 |
| Milk N (8 Fl. Oz) | 0 | 0 | 8 | 0 | 8 |
| Segment | N | S | T | N | R |

ADVERTISING LOG

| Weekly Purchases, Units | Household 1 | Household 2 | Household 3 | Household 4 | Household 5 |
|---|---|---|---|---|---|
| ADVERTISEMENT 1 | 3 | 3 | 3 | 3 | 3 |
| ADVERTISEMENT 2 | 4 | 4 | 4 | 4 | 4 |
| ADVERTISEMENT 3 | 2 | 1 | 1 | 2 | 1 |
| ADVERTISEMENT 4 | 1 | 1 | 1 | 1 | 1 |
| ADVERTISEMENT 5 | 2 | 0 | 0 | 1 | 0 |
| ADVERTISEMENT 6 | 1 | 0 | 0 | 1 | 1 |
| ADVERTISEMENT 7 | 0 | 2 | 0 | 1 | 0 |
| ADVERTISEMENT 8 | 0 | 1 | 2 | 0 | 0 |
| ADVERTISEMENT 9 | 1 | 0 | 0 | 3 | 0 |
| ADVERTISEMENT 10 | 0 | 0 | 0 | 0 | 3 |
| ADVERTISEMENT 11 | 1 | 1 | 1 | 1 | 0 |

FIG. 6

SYSTEMS AND METHODS TO SELECT TARGETED ADVERTISING

RELATED APPLICATIONS

This patent arises from a continuation of U.S. application Ser. No. 15/990,341, filed on May 25, 2018, which is a continuation of U.S. application Ser. No. 12/964,481, filed on Dec. 9, 2010, which is a non-provisional application of and claims the benefit of U.S. Provisional Application Ser. No. 61/355,882, which was filed on Jun. 17, 2010. Priority to U.S. application Ser. No. 15/990,341, U.S. application Ser. No. 12/964,481, and U.S. Provisional Application Ser. No. 61/355,882 is claimed. U.S. application Ser. No. 15/990,341, U.S. application Ser. No. 12/964,481 and U.S. Provisional Application Ser. No. 61/355,882 are hereby incorporated herein by reference in their entireties.

FIELD OF THE DISCLOSURE

This disclosure relates generally to targeted advertising and, more particularly, to methods and apparatus to select targeted advertising.

BACKGROUND

Product manufacturers and advertisers try to increase demand for their products by influencing the behavior of target consumer segments. Survey research is used to collect information about consumer attitudes and preferences. Behavioral information, whether observed directly or collected through survey research, can be used to predict demand. The manufacturers try to influence consumer preference through use of adverting strategies to increase demand. A manufacture will try to optimize its advertising spending by targeting specific consumer segments that represent a high opportunity for the manufacturer to influence consumer behavior by raising consumer awareness. Since consumer attitudes and preferences are constantly changing, manufacturers must continually monitor attitudes and preferences to predict demand, as well as continue to influence consumer preference through advertising.

BRIEF DESCRIPTION OF THE DRAWINGS

FIG. 4 is a table illustrating example weekly purchases for several households and products.

FIG. 5 is a table illustrating example expected weekly purchases per household by segment for several products.

FIG. 6 is a table illustrating an example advertising log for several households and several advertisements.

DETAILED DESCRIPTION

Figure 1:
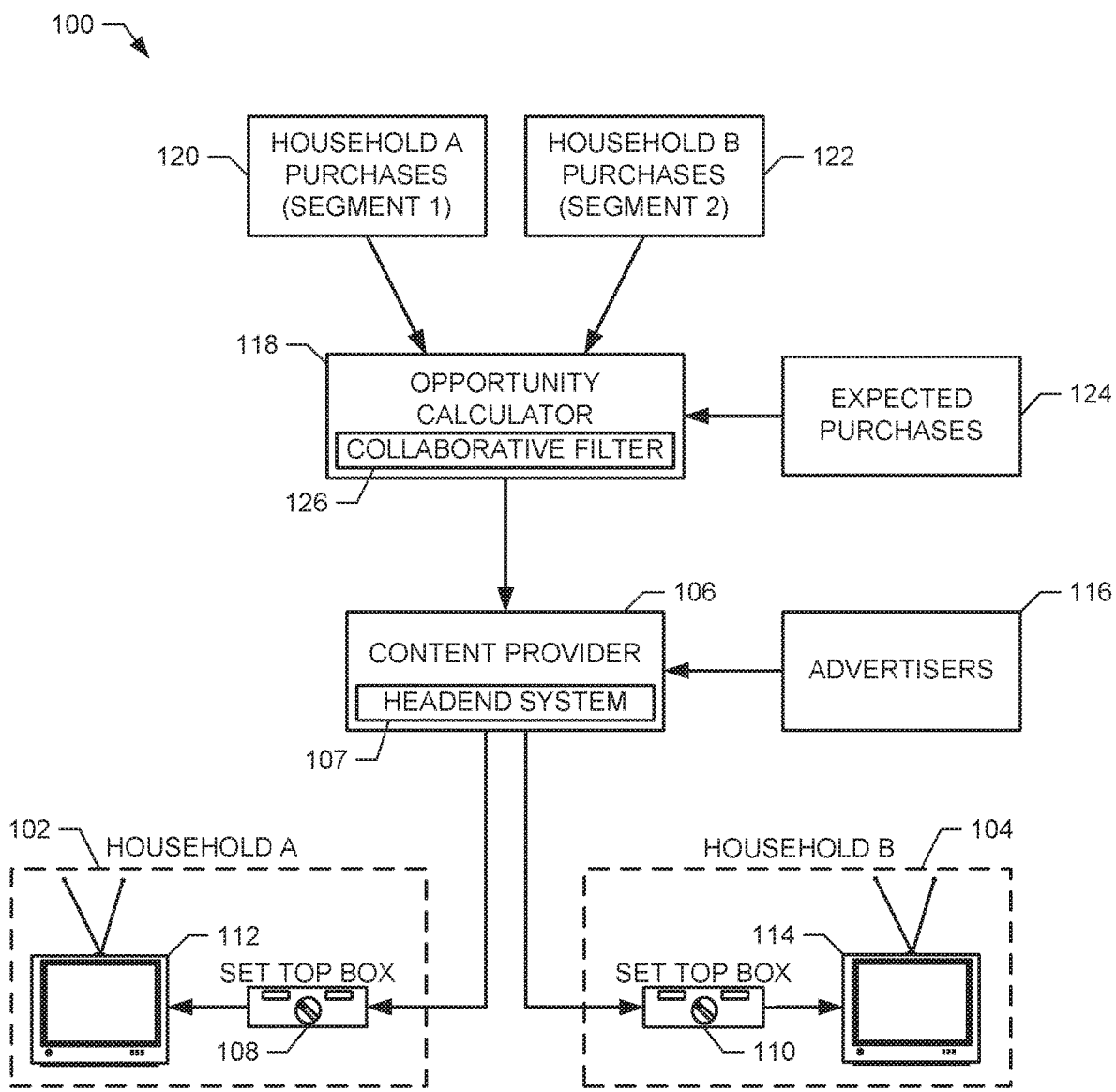
FIG. 1 is a block diagram of an example system to provide individually-targeted advertising to different households based on an opportunity metric.

Although the example systems described herein include, among other components, software executed on hardware, such description is merely illustrative and should not be considered as limiting. For example, it is contemplated that any or all of the disclosed hardware and/or software components could be embodied exclusively in dedicated hardware, exclusively in software, exclusively in firmware or in some combination of hardware, firmware, and/or software.

Cable providers typically sell broadcast advertising time to advertisers. Targeted advertising is a method of advertising performed by placing advertisements at times and locations where a particular type of consumer (e.g., a particular demographic segment) that is likely to be influenced to purchase the advertised product is likely to view the advertisement. Advertisers often look to increase the effectiveness of their advertisements by using targeted advertising.

When considering how much money to spend on an advertisement, an advertiser will consider the reach of the advertisement (i.e., the number of viewers or households who view the advertisement in a given period of time) and the frequency with which the advertisement is shown. As the reach of the advertisement increases, more consumers may view the advertisement and the number of consumers who may be influenced to purchase a product is increased. However, as the frequency of the advertisement increases, the advertisement may lose its effectiveness over time. Specifically, repeated showings of an advertisement to a consumer tend to diminish the effect of the advertisement with each additional showing. Thus, additional resources spent on showing a "stale" advertisement may be better spent on other (non-stale) advertisements.

The example systems and methods described herein are useful for effectively selecting and displaying advertising targeted to individuals and/or households. In some examples, an advertisement is selected for display to a household based on an opportunity metric generated for the household with respect to a product. Different advertisements may be selected for delivery to different households via, for example, a set top box installed at each of the households. The example systems and methods also consider the likely effectiveness of additional showings of a particular advertisement to a particular household (e.g., based on a number of prior showings and historical data showing the relationship(s) between the frequency of showings and effectiveness) and further adjust the selection of the advertisements to a household based on the predicted effectiveness. By controlling the selection of individually-targeted advertisements as described herein, content providers may increase the revenue generated by selling advertisement space and may improve the effectiveness of advertisement spending by advertisers.

Example systems and methods described herein select advertisements for individual household delivery based on a highly individualized and dynamic opportunity metric or score with respect to a product. Previous systems use proxy methods to measure purchasing such as, for example, measuring television program audiences to approximate the number and types of households purchasing a product. However, such approaches do not adapt well in view of purchases of an individual household. In contrast, the example systems and methods disclosed herein can present the most effective advertisements to a particular household, because the selected advertisements change as the household adjusts its purchasing habits over time. The speed with which the example systems and methods adjust the opportunity calculations may keep pace with the rate at which consumers make their purchases and respond to advertisements.

As used herein, the saturation of a household with respect to an advertisement refers to the effectiveness of the advertisement for future showings of the advertisement. Saturation may be limited to periods of time, after which the saturation of the household is reset, or may continue indefinitely. When a household is said to have "reached" saturation, future presentations of the advertisement generally have reduced effectiveness relative to earlier presentations.

FIG. 1 is a block diagram of an example system 100 to provide individually-targeted advertising to different households A 102 and B 104 based on an opportunity metric. The example system 100 includes a content provider 106 such as a cable television company to deliver programming and advertisements to a number of households A 102 and B 104. The households A 102 and B 104 are provided with respective set top boxes 108 and 110 coupled to televisions 112 and 114. The content provider 106 may broadcast programming via a headend system 107 over a plurality of channels, to which the set top boxes 108 and 110 may tune to receive the broadcast programming. Additionally or alternatively, the content provider 106 may provide a library or catalog of programming and/or advertisements that may be selected for on-demand delivery to either or both of the set top boxes 108 or 110. The tuned or delivered programming is displayed on the respective televisions 112 and 114. The television could alternatively or additionally be implemented by personal computer monitors or the like.

In the example system 100, the content provider 106 sells time on each of one or more channels to one or more advertisers. The content provider 106 may agree to broadcast particular advertisements to the set top boxes 108 and 110 and, thus, the televisions 112 and 114 for display to consumers.

Advertisers seek to increase the effectiveness of their advertising expenditures by a) increasing the size of the audience that is exposed to their advertisements; and/or b) spending advertising resources in a manner designed to concentrate exposure of the advertisements on segments of consumers who are more likely to purchase the product being advertised. By increasing the audience that views an advertisement, the advertiser can increase the number of people who are influenced by the advertisement on the theory that a given advertisement will influence a percentage of people to purchase the product. However, by concentrating an advertisement's exposure on a particular class or segment of people who are more likely to be influenced than the public at large (e.g., because the product is of more interest to them), each unit of advertising resources can influence a relatively larger number of people to purchase the product being advertised.

Traditionally, consumers have been grouped or classified by broad demographic and/or geographic segments. Surveys, shopper membership cards, and other data collection methods have been used to aid advertisers in determining when and where to place advertisements. However, these methods relied on massive generalizations of geodemographic data to purchasing habits. As a result, these prior methods may only yield nominal statistical improvements in some cases. In contrast, the example system 100 of FIG. 1 includes an opportunity calculator 118 to determine opportunity metrics for the individual households A 102 and B 104. The opportunity metrics are representative of the opportunity a household represents to advertisers of particular products based on purchase data 120 and 122 for respective individual households A 102 and B 104 and expected purchase data 124.

The household purchase data 120 and 122 identifies purchases made by the respective example households A 102 and B 104. The purchase data 120 and 122 may be provided to the opportunity calculator 118 by, for example, self-reporting purchases, using a purchase logging device to identify and/or log purchases' (e.g., a Nielsen HomeScan® device used in panel tracking), and/or any other reporting method and/or combination of reporting methods. Self-reporting may occur via filling out a survey and/or keeping a manual and/or electronic log of purchases.

Another example method to collect purchase data by household may include collecting frequent shopper card data. Many retail stores currently issue frequent shopper cards to persons who volunteer personal information. The personal information may include any one or more of the person's address, the person's personal or household demographics, the person's personal preferences, and/or any other voluntarily-provided personal data. A frequent shopper card is scanned whenever the carrier of the frequent shopper card makes purchases at the issuing retailer, and the purchased items are logged and attributed to the carrier of the frequent shopper card. In exchange for the personal information and monitoring ability provided by the frequent shopper card, the retailer offers discounts on purchases to the carrier of the card. The retailer may then use the collected purchase data to identify patterns or perform other data operations to obtain useful shopper data.

The expected purchases, as described in more detail below, may be determined by a collaborative filter 126 that determines a quantity of a product that the households A 102 and B 104 might be expected to consume (e.g., per day, per week, per month, per year) based on the segment(s) in which the households A 102 and B 104 may be classified and what those segment(s) typically purchase. By determining the difference between what quantity of a given product the respective households A 102 and B 104 are expected to purchase (e.g., expected purchases 124 of FIG. 1) and what quantity of that product the households A 102 and B 104 actually purchased as reflected in the purchase data 120 and 122, the opportunity calculator 118 generates an opportunity metric. The opportunity metric is provided to the content provider 106 to enable the content provider 106 to select the most appropriate (e.g., effective) advertisements to be delivered to the households A 102 and B 104.

To evaluate the relationships between different items, the collaborative filter 126 may be populated and/or updated with the purchasing relationships between different goods and/or brands. The collaborative filter 126 may be maintained by, for example, a research service or agency that performs market research of consumer segments and behaviors.

Figure 2:
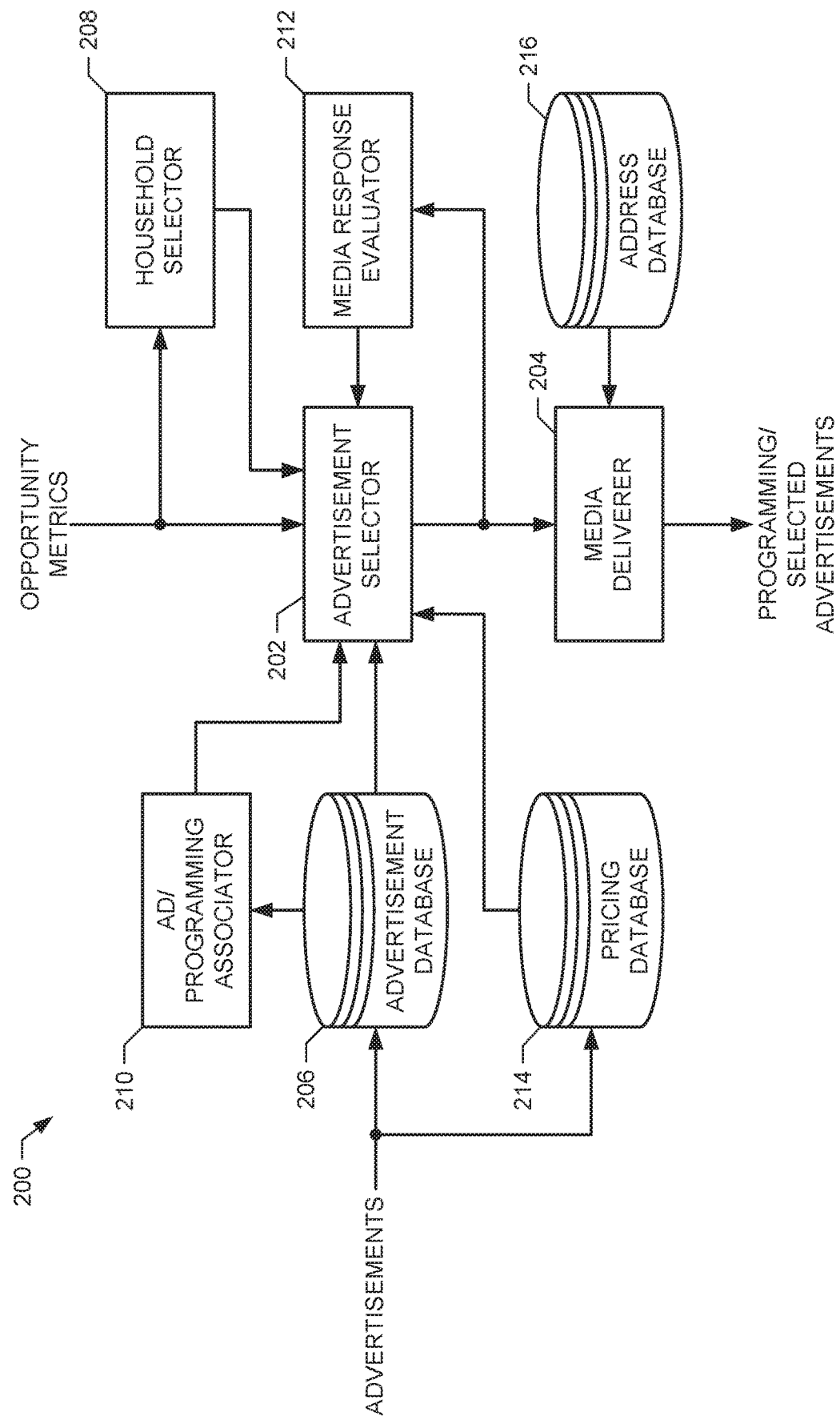
FIG. 2 is a more detailed block diagram of an example implementation of the headend system of the cable provider described in connection with FIG. 1.

FIG. 2 is a more detailed block diagram of an example headend system 200 to implement the headend system 107 of the content provider 106 described in connection with FIG. 1. The headend system 200 may be used to select and display advertisements for individual households (e.g., the households A 102 and B 104) based on one or more opportunity metrics. For clarity and brevity, the following description of FIG. 2 will reference an example where the headend system 200 considers the household A 102 of FIG. 1. The example headend system 200 includes an advertisement selector 202 to select an advertisement for delivery to a household via a media deliverer 204. The media deliverer 204 may be implemented via, for example, a cable broadcast system. In the illustrated example, the media deliverer 204 is in communication with multiple subscriber set top boxes (e.g., the set top boxes 108 and 110 of FIG. 1).

The advertisement selector 202 is provided with an advertisement database 206, from which the advertisement selector 202 may choose advertisements associated with one or more products. The advertisements may be provided to the database 206 by one or more advertisers (e.g., the advertisers 116 of FIG. 1) who wish to have their product advertisement(s) targeted at households that have a high opportunity metric corresponding to the product(s) being advertised.

The advertisement selector 202 receives several inputs to determine an advertisement that should be delivered to a particular household. For example, the advertisement selector 202 receives the selection of a household A 102 from a household selector 208. The selection of the household focuses the advertisement selector 202 on the household A 102 that should be considered for individual advertisement delivery. As mentioned above, the advertisement selector 202 receives the opportunity metric(s) for one or more products. Because the opportunity metric(s) are specific to an individual household, the advertisement selector 202 considers the opportunity metric(s) corresponding to the household selected by the household selector 208.

In the illustrated example, the advertisement selector 202 also receives programming association information from an ad/programming associator 210. The ad/programming associator 210 identifies advertisements for products in the advertisement database 206 which are appropriate for programming currently shown to the household A 102. For example, if a first advertisement and a second advertisement in the advertisement database correspond to equal or similar opportunity metric(s) for the household A 102, the associator 210 may identify an association between the first advertisement and the program being viewed at the household that causes the selector 202 to select the first advertisement for delivery. For example, if a young children's program is being viewed at the household A 102, the associator 210 may indicate that a first advertisement for cereal has a more appropriate association with the program than a second advertisement for coffee. In such a case, the selector 202 may give weight to the association and select the advertisement for cereal.

The example advertisement selector 202 further receives advertisement response data for the household A 102 from a media response evaluator 212. The media response evaluator 212 monitors the advertisements that are shown to the household A 102 (e.g., that are sent from the advertisement selector 202 to the media deliverer 204 and/or that are sent to the household A 102 during the course of regular programming and advertisement) and reports to the selector 202 whether the advertisement being considered has been shown to the household A 102 enough to cause the advertisement to lose its effectiveness with respect to the household A 102. For example, when the advertisement selector 202 sends a selected advertisement to the media deliverer 204 for delivery to the household A 102, the selected advertisement (or, alternatively, metadata identifying the advertisement) is also sent to the media response evaluator 212. The media response evaluator 212 uses one or more marketing mix models or saturation algorithms to determine whether the household A 102 has been presented with the advertisement often enough to reduce the effectiveness of the advertisement on future presentations.

As an example of the operation of the media response evaluator 212, assume that the advertisement selector 202 is considering two advertisements: one for product X and one for product Y for delivery to the household A 102. The opportunity metric for the household A 102 associated with product X is higher than the opportunity metric associated with the product Y. However, the advertisement associated with product X has been shown to the household A 102 many times, while the advertisement associated with product Y has not yet been shown to the household A 102. As a result, the media response evaluator 212 determines that the effectiveness of the advertisement for product X is reduced because the household A 102 has become saturated with the message presented by the advertisement. In contrast, the effectiveness of an advertisement for product Y is still relatively high (given the lower opportunity metric for product Y). The calculated effectiveness of showing each advertisement may then be correlated to a price to charge an advertiser to show its advertisement.

In operation, the example headend system 200 receives opportunity metric(s) that are individualized for several households. The household selector 208 selects one of the households to be considered by the advertisement selector 202. The advertisement selector 202 receives (e.g., requests, retrieves from storage, etc.) the opportunity metric(s) associated with the selected household. The advertisement selector 202 evaluates the products for which an opportunity metric is provided and determines whether the household is saturated with the advertisement(s) for any of the product(s). Saturation information may be requested from the media response evaluator 212, which determines the saturation and/or the future media response of the household to the potential advertisement(s). The media response evaluator 212 may perform the evaluation on request from the advertisement selector 202 and/or have previously prepared evaluations stored. For those advertisement(s) that have reached saturation, the advertisement selector 202 applies a penalty.

The advertisement selector 202 loads a pricing structure, pricing characteristic, or pricing framework from the pricing database 214 and determines, based on the opportunity metric(s) and the saturation of the advertisements, which advertisement(s) may command the highest price from advertisers due to the likelihood that the advertisement(s) will be effective. The advertisement selector 202 provides the selected advertisement(s) to the media deliverer 204, which determines the set top box address associated with the selected household from the address database 216 and delivers the advertisement(s) to the address at the appropriate time. The advertisement(s) are further provided to the media response evaluator 212 to determine the response of the selected household to further presentations of the selected advertisement(s).

Figure 3A:
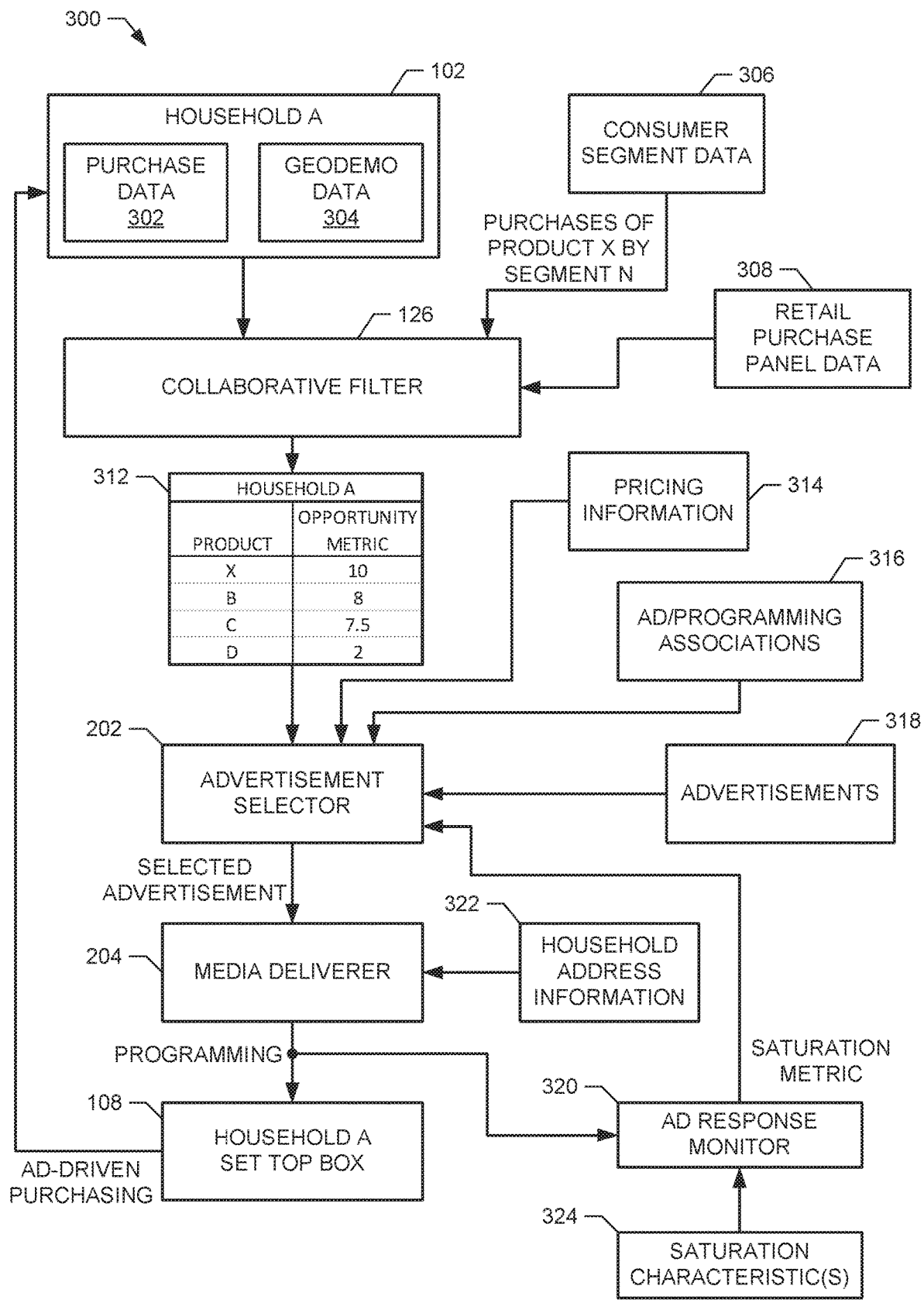
FIG. 3A is a block diagram illustrating example data flows that may occur in the example systems illustrated in FIGS. 1 and 2.

FIG. 3A is a block diagram illustrating example data flows that may occur in the example systems illustrated in FIGS. 1 and 2. The example data flows illustrated in FIG. 3A show the exchanges of data between the household A 102, the content provider 106, the set top boxes 108 and 110, and the advertisers 116. While the example household A 102 is illustrated in FIG. 3A, the example exchanges of data may be used in a similar or identical manner with respect to additional households (e.g., the household B 104). The data flows 300 of FIG. 3A further detail the exchange of data between the advertisement selector 202, the media deliverer 204, the advertising database 206, the household selector 208, the ad/programming associator 210, the media response evaluator 212, the pricing database 214, and the address database 216 within the example headend system 200 of FIG. 2.

For clarity and brevity, the example data flows 300 of FIG. 3A will refer to the selection of advertisement(s) for delivery to the household A 102 of FIG. 1 without regard to the household B 104. However, the examples described herein may be extended to include any number of households.

The example household A 102 of FIG. 1 is associated with purchase data 302 (e.g., the products and quantities purchased by the household during a given time period, etc.) and geodemographic data 304 (e.g., the household geographic location, the number of persons in the household, the number of children, the ages of the persons in the household, etc.). The purchase data 302 and the geodemographic data 304 may be provided by, for example, self-reporting by the household A 102 and/or monitoring techniques practiced within the household A 102. The purchase data 302 may additionally or alternatively be provided through the use of frequent shopper card data associated with frequent shopper cards carried by members of the household A 102.

Based on the purchase 302 and demographic data 304, the household A 102 fits into a segment of consumers. Members of the consumer segment are identified as part of other marketing studies and their purchases are tracked over time. Consumer segment data 306 may be developed and/or updated to reflect, for example, new product offerings, purchasing trends, and/or changes in membership characteristics. Additionally, retailer purchase panel data 308 is collected at different points of sale. In some examples, the product purchase data 308 is collected from as many retailers or other points of sale as possible. Additionally or alternatively, the retailer purchase panel data 308 is received from a data processing facility that has collected, aggregated, and/or processed purchase data from multiple retailers (e.g., a set of retailers in one or more geographic areas). The processed purchase data may be filtered to provide data that is particularly useful to determining the expected purchases of the household A 102 and/or the segment.

The purchase data 302 and the geodemographic data 304 from the household A 102, the relevant consumer segment data 306, and the relevant retailer purchase panel data 308 are input to a collaborative filter 126. The purchase data 302 provided to the collaborative filter 126 may include product identifiers and quantities per time period. The geodemographic data 304 of the illustrated example includes sufficient geodemographic information to place the household A 102 into a consumer segment. The example consumer segment data 306 of the illustrated example provides at least the segment purchase information of the products purchased by the household A 102. The consumer segment data 306 may additionally provide available product purchase information for the consumer segment into which the household A 102 fits. The retailer purchase panel data 308 provides bills of sale that illustrate the combinations of products that are often purchased together.

The collaborative filter 126 receives the purchase data 302 and the geodemographic data 304 from the household A 102, the consumer segment data 306, and the retailer purchase panel data 308, and determines one or more opportunity metric(s) for one or more products based on the received information. For example, the purchase data 302 includes a quantity of a product X (e.g., a brand of a product) purchased weekly by the household A 102. The geodemographic data 304 allows the collaborative filter 126 (or some other classification device) to generate a purchase expectation for the household A 102 based on placement of the household A 102 into a segment (e.g., segment N). The placement of the household A 102 into the segment N may be based on other data besides geodemographic data, such as the purchase data 302.

The consumer segment data 306 provides the typical (e.g., average) weekly purchases of one or more products, including product X, by households in the segment N. Thus, the collaborative filter 126 may determine the amount by which the household A 102 is below or above the typical weekly purchases for the segment N. Retailer purchase panel data 308 allows the collaborative filter 126 to evaluate the combinations and quantities of products that are often purchased together, which may then be applied to the purchase data 302 to determine any other products that the household may be interested in based on its purchases of product X and the historical purchasing trends associated with the segment N.

Unlike known collaborative filters, the example collaborative filter 126 does not assume that once a product is purchased, the product no longer needs to be purchased again (or that the product does not need to be purchased long enough to assume no further purchase is desired). Such an assumption may be appropriate when recommending media, toys, consumer electronics, books, and/or other durable goods and/or items for which one purchase is often sufficient, based on previous purchases of such items. Instead, the collaborative filter 126 of FIG. 3A determines recommended or high-opportunity items based on volumetric purchases such as foodstuffs, cleaning supplies, personal hygiene items, and/or other consumable items which are purchased and consumed with some regularity. However, the collaborative filter 126 may also determine or account for products that are generally purchased infrequently.

The collaborative filter 126 determines, based on the purchases 302 of the household A 102 and historical purchasing trends of the related segment N, items that may be desirable substitutes for and/or supplements to products the household A 102 currently purchases. By determining the segment (e.g., N) of the household A 102, the collaborative filter 126 determines the quantity of the product X that is typically purchased by households in the segment N, the additional quantity of the product X that the household A 102 should be buying based on its segment if the quantity purchased by the household A is below the typically purchased quantity, and similar products and quantities purchased by households in the segment N which have not been purchased or have been under-purchased by the household A 102. The collaborative filter 126 further determines additional products that may be similar or dissimilar to the product X that are often purchased by households in the segment N based on the retailer purchase panel data 308. In some examples, the retailer purchase panel data 308 is at least partially used to determine the consumer segment data 306.

The collaborative filter 126 outputs one or more opportunity metrics 312 for each product (e.g., products X, B, C, and D) that are identified as having an opportunity associated with the household A 102. The opportunity metric of a product X is based on the purchase data 302 of the household A, the segment N in which the household A is located, and the typical purchases of the product X, the product's substitutes, and/or the product's complements by households in the selected segment N.

For example, assume the household A 102 purchases thirty-six cans of soft drink D per week, households in the segment N purchase an average of twenty-four cans of soft drink X per week and twenty-four cans of soft drink D per week. Additionally, assume the household A 102 purchases zero ounces of potato chips B per week and members of segment N average purchases of sixteen ounces of potato chips B per week. In this example case, the collaborative filter 126 determines that the opportunity for motivating the household A 102 to increase its purchases of soft drink D is low because it currently purchases more of soft drink D than is typical for segment N. In contrast, the opportunity for soft drink X is high, because the household A 102 purchases none of soft drink X compared to the average of 12 cans of soft drink X per week. Therefore, advertising soft drink X to the household A 102 may be highly likely to influence the household A 102 to increase its purchases of soft drink X. Additionally, the collaborative filter 126 determines that the opportunity for potato chips B is high because the average purchases for potato chips B among households in segment N is sixteen ounces per week and household A is currently not purchasing chips. Thus, an advertisement for potato chips B may have a relatively higher likelihood to influence the household A 102 to increase its purchases of potato chips B. If desired, the purchase data may be supplemented with user-specific data collected via, for example, a survey reflecting user preferences, dietary habits, medical conditions, allergies, etc. This supplemental data may be factored in by the collaborative filter 126.

The opportunity metric(s) 312 developed by the opportunity calculator 118 of FIG. 1 are input to the advertisement selector 202 of FIG. 2. In addition to the opportunity metric(s) 312, the advertisement selector 202 receives pricing information 314 (e.g., from the pricing database 214 of FIG. 2), advertisement/programming associations 316 (e.g., from the ad/programming associator 210 of FIG. 2), advertisements 318 (e.g., from the advertisement database 206 of FIG. 2), and household saturation information (e.g., a saturation metric) from an advertising response monitor 320 (e.g., from the media response evaluator 212 of FIG. 2). The selection of the household A 102 (e.g., from the household selector 208 of FIG. 2) is identified expressly or implicitly in the delivery of the opportunity metric(s) 312 for household A 102.

While the example opportunity metric(s) 312 are shown in FIG. 3A as a score, the opportunity metric(s) 312 may be presented or measured in any suitable manner. For example, the opportunity metric(s) of the household A 102 with respect to a product may be represented in terms of a normalized or gross score, a monetary amount (e.g., dollars/year), units of product (e.g., ounces/year), or any other appropriate unit or score.

The pricing information 314 may include, for example, a function based on the opportunity metric(s) of a particular product, a pricing structure based on a client and/or volume of advertisements, or other pricing structure, characteristic, and/or factors. In some examples, the pricing information 314 includes a function that increases the price of delivering a particular advertisement to a particular household or to a number of households based on the opportunity metric(s) associated with the advertised product and the household.

In some example advertisement pricing models, a media provider (e.g., the media provider 200 of FIG. 2) contracts with an advertiser (e.g., the advertisers 116) to provide an advertisement with a certain number of viewers. The number of viewers may be calculated using, for example, reach and frequency numbers. Certain measures of advertisement exposure (e.g., gross ratings points) may consider showing an advertisement once to each person in a population to be equivalent to showing the advertisement twice each to half of the people in the population. In some examples, the media provider 200 may agree to provide an advertisement with a specified reach and frequency to households having a minimum opportunity metric for a price premium reflecting the improved advertising opportunity to the advertiser 116. The advertiser 116 may determine that the premium is acceptable, or even a bargain, to target fewer households having a high opportunity metric instead of targeting a more general audience. However, many different methods and models of advertisement pricing based on the opportunity metric are available and are considered within the scope of the examples described herein. Pricing methods and models may be easily modified to improve revenue to both the media provider 200 and the advertisers 116.

In some examples, the media provider 200 may determine the opportunity metric for a type of product as opposed to a particular brand. For example, cola is a type of product where Coke® and Pepsi® are particular brands. To increase revenue, the media provider 200 may solicit bids from the manufacturers of different colas on reach and frequency agreements for advertising priority to households having the highest opportunity metrics for cola.

The advertising/programming associations 316 may include, for example, broadcast programs that advertisers identify as preferable to identify with advertised products. For example, the ad/programming associations 316 may include an association between a breakfast cereal C and a children's program specified by the advertiser or manufacturer of breakfast cereal C. These associations may be stored in a table and may be manually input based on data and/or requests from advertisers, broadcasters, and/or content creators.

The advertisements 318 include at least the advertisements for products having an opportunity metric provided by the collaborative filter 126. In some examples, the advertisements 318 include multiple different advertisements (e.g., variants of an advertisement or completely different advertisements) that may be shown to the household for the same product. Thus, the advertisement selector 202 may show different advertisements for the same product to the household A 102, thereby decreasing the saturation of the household A 102 to advertisements for a product. By changing the advertisements for a product, the advertisement selector 202 may maintain higher revenue for an advertisement mix sent to the household A 102 by maintaining a high effectiveness of the advertising mix.

The ad response monitor 320 monitors the advertising sent to the household A 102. The ad response monitor 320 may monitor only household A and/or may be part of a larger section which monitors broadcast advertising sent to program viewers in a geographic area of interest. Broadcast advertisements may be identified in any manner, such as by reading an identification code embedded in (or otherwise broadcast with) the broadcast advertisement. Based on the advertising sent to the household A 102, the ad response monitor 320 determines saturation metric(s) of the household A 102 with respect to one or more advertisements. As the number of times a particular advertisement is presented to household A 102 increases, the ad response monitor 320 determines that the incremental effectiveness of that advertisement decreases with additional showings (i.e., the total effectiveness increases more slowly). The example ad response monitor 320 thus provides a penalty to be applied to certain advertisements 318 that may be selected by the advertisement selector 202 when the advertisements 318 have been shown a sufficient number of times. Additionally, consumers with different demographics may tend to have different ad response characteristics or the ad response characteristics used by the ad response monitor 320 may change over time. Therefore, the ad response monitor 320 may be provided and/or updated by, for example, a consumer research service or agency that specializes in consumer behavior.

Figure 3B:
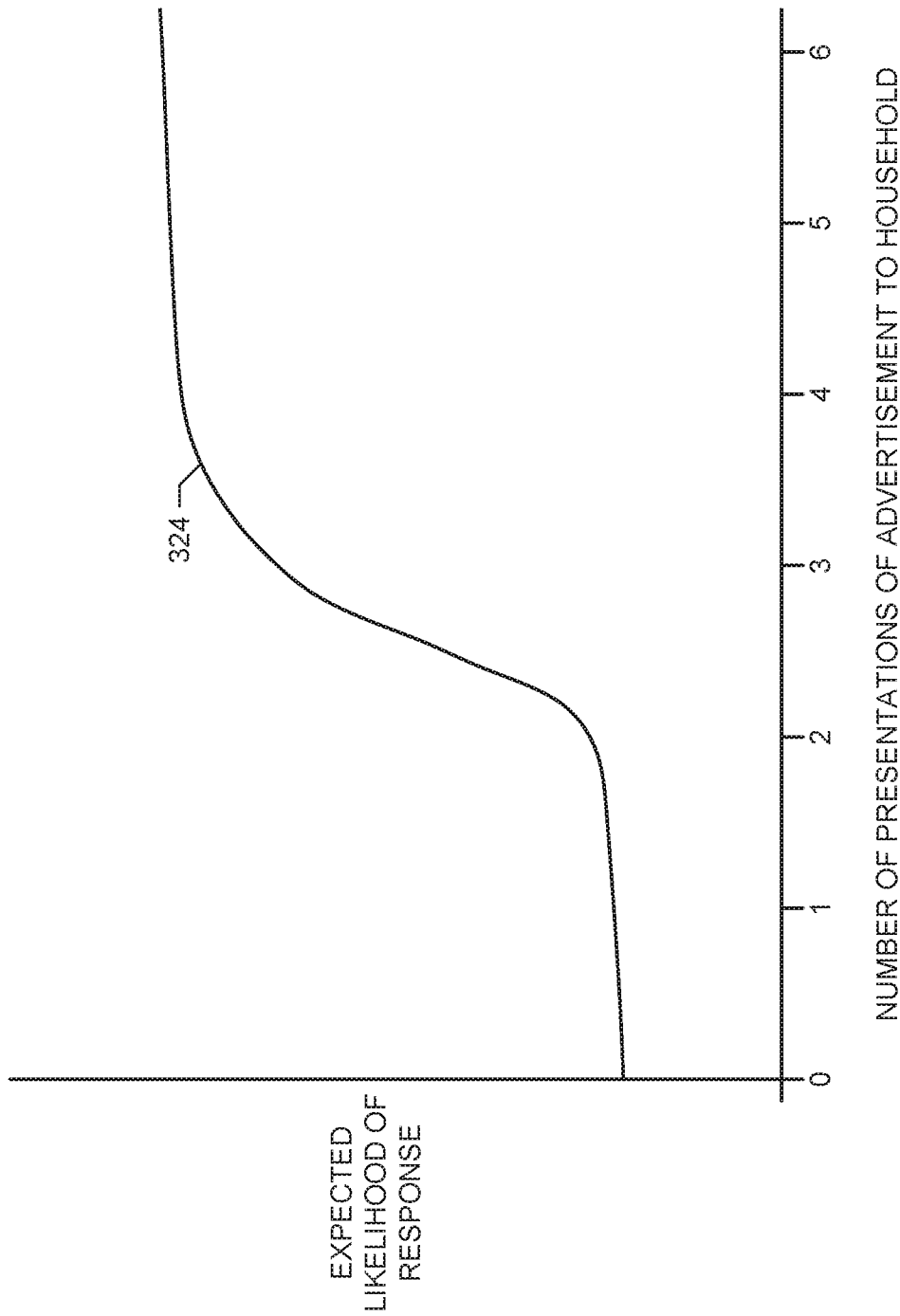
FIG. 3B illustrates an example advertisement saturation characteristic for an advertisement of a product with respect to a household.

As the number of times an advertisement 318 is shown increases beyond a saturation point, the ad response monitor 320 increases the penalty. In some examples, however, the penalty may decrease from the first presentation to the second and/or third (and/or additional) presentations and then increase for presentations after the third (or later) presentation. One or more saturation characteristic(s) 324 provide models for the ad response monitor 320 to apply the penalty. An example of such a saturation characteristic is illustrated in FIG. 3B. Thus, while advertisements for products having mid- to high-range opportunity metrics with respect to the household A 102 may be sufficiently high to overcome the penalties and, thus, continues to be shown, after an advertisement 318 has been shown often enough the price for that advertisement 318 will be overtaken by another advertisement offering a higher price because it is expected to exhibit higher advertising effectiveness.

When the advertisement selector 202 has received the pricing information 314, the advertisement/programming associations 316, the advertisements 318, and the saturation metric(s) from the ad response monitor 320, the advertisement selector 202 selects an advertisement for delivery and/or presentation to the household A 102 (e.g., via the set top box 108 and the television 112 of FIG. 1). The selected advertisement and the destination for the advertisement (e.g., household A 102) are provided to the media deliverer 204. The media deliverer 204 also receives household address information 322 corresponding to the set top box 108 in the household A 102. The address information may include, for example, a media access control (MAC) address, an Internet protocol (IP) address, or any other type of network layer or other type of address that uniquely identifies the set top box 108 of household A 102. The media deliverer 204 delivers the selected advertisement to the set top box 108 in household A 102 at the appropriate time, such as shortly prior to the time space sold by the content provider 200.

The media deliverer 204 may also be responsible for broadcasting (e.g., to a large portion of the possible audience) programming and/or advertisements to the households 102 and 104. In addition to providing the selected advertisements (e.g., advertisements individually selected for a household) and broadcast advertisements (e.g., advertisements not individually selected for a household) to the household A 102, the media deliverer 204 further provides and/or identifies the selected advertisements and broadcast advertisements to the ad response monitor 320. As mentioned above, the ad response monitor 320 monitors the advertisements presented to household A 102 and provides household saturation information (e.g., a saturation metric) to the advertisement selector 202 to select future advertisements for delivery to the household A 102. Thus, the ad response monitor 320 uses the identified advertisements to update the saturation metric or level.

The advertisements provided to the set top box 108 and/or presented to the household A 102 may be further fed back to the advertisement selector through advertisement-driven purchasing by the household A 102. For example, when an advertisement stimulates purchases of product X that previously had a high opportunity metric, the collaborative filter 126 may determine that the opportunity metric for the household A 102 for product X decreases because the quantity of product X that the household A 102 is expected to purchase has been constant for the relevant time period, unless the household A 102 changes segment or the behavior data associated with the segment changes as may happen over time (e.g., seasonally). As a result, the advertisements for product X become less effective and new products may be advertised to the household A 102 at a higher effectiveness and, thus, a higher price.

The example data flows illustrated in FIG. 3A may be performed by any one or more parties. In some examples, a cable or other media provider (e.g., the content provider 106) of FIG. 1 may implement at least the advertisement selector 202, the media deliverer 204, and the ad response monitor 320 to deliver media and advertisements to households and to maintain a high degree of responsiveness to saturation of households. In some examples, a media research organization may collect and/or process the purchase data 302, the geodemographic data 304, the consumer segment data 306, the retail purchase data 308, and/or implement the collaborative filter 126 to generate opportunity metrics. The media research organization then provides the opportunity metrics to a content provider to select and deliver advertisements. In some examples, the media research organization may additionally provide and/or update the saturation characteristic(s) 324 to improve the selection of advertisements. While the data flows may be implemented by any one or more parties, the examples described above may leverage existing expertise and relationships to improve service to advertisers and consumers.

FIG. 3B illustrates an example advertisement saturation characteristic 324 for an advertisement of a product X with respect to the example household A 102. The horizontal axis is representative of the number of presentations of the advertisement to the household A 102. The vertical axis is representative of the expected likelihood that the household A 102 will exhibit a response or behavior (e.g., purchasing the advertised product). As illustrated in FIG. 3B, the expected likelihood of a response increases more rapidly between the second presentations and the third presentation than for other presentations (e.g., between the first and second presentations, between the fourth and fifth presentations, etc.).

The example saturation characteristic 324 may be provided to, for example, the ad response monitor 320 to determine a saturation metric for the product X and the household A 102. The ad response monitor 320 determines the number of presentations of the advertisement to the household A 102 and generates a saturation metric (e.g., a penalty). The ad response monitor 320 provides the saturation metric to the advertisement selector 202, which may apply (e.g., subtract, multiply, etc.) the saturation metric to the corresponding opportunity metric to generate a net effectiveness metric. Different advertisements for the same product X may have different net effectiveness metrics depending on the number of times the respective advertisements have been presented to the example household A 102. The advertisement selector 202 may then select an advertisement for delivery to the household A 102 by, for example, comparing the net effectiveness metrics to a threshold. In some examples, the threshold is determined by an agreement with an advertiser. However, the net effectiveness metrics may be used to identify an advertisement for delivery in any appropriate manner.

According to the example saturation characteristic 324, the ad response monitor 320 may cause the saturation metric of the household A 102 to the advertisement to be higher after the household A 102 has been presented the advertisement five times than after the household A 102 has been presented the advertisement two times. However, according to the saturation characteristic 324, the saturation metric after the household A 102 has been presented the advertisement once may be very similar to the saturation metric after the household A 102 has been presented the advertisement five times.

The example saturation characteristic 324 may be represented by the equation $y=1+e^{A+Bf}$, where y is the expected likelihood of response, f is the frequency with which presentations of an advertisement are presented to a household, and A and B are variables that may be determined empirically by, for example, a media research organization.

While an example saturation characteristic 324 is illustrated in FIG. 3B, saturation characteristics 324 may be additionally and/or alternatively represented by, for example, a mathematical algorithm, a lookup table, or any other appropriate representation. Further, the saturation characteristic 324 may differ between household, segment, and/or product combinations.

FIG. 4 is a table 400 illustrating example expected weekly purchases per household by segment. The example table 400 may be representative of the consumer segment data 306 of FIG. 3A for example segments N, Q, R, S, and T. The table 400 includes the expected purchases of several products, including beer Z, chips B, bread H, bread J, and milk M. The expected purchases provided by table 400 may be used by the collaborative filter 126 to determine opportunity metrics with respect to the products Z, B, H, J, and/or M for households belonging to the segments N, Q, R, S, and/or T. The example product references Z, B, H, J, and M are representative and would normally be replaced with brand names of corresponding products and/or other identifiers such as the UPC or the SKU of a product.

FIG. 5 is a table 500 illustrating example weekly purchases for several households by product. The example table 500 may be provided to the collaborative filter 126 and used in combination with the example table 400 to determine the opportunity metrics of the households 1-5 listed in the table 400 with respect to the listed products. The example table 500 further includes the segment that each household 1-5 falls into based on similar purchases and/or geodemographic information.

To generate the opportunity metrics for the households 1-5, the collaborative filter 126 compares the purchases of each of the relevant products in the example weekly (or other time period) purchases table 500 with the expected purchases of the corresponding products found in the appropriate segment row of the expected purchases table 400. For example, the collaborative filter 126 compares the weekly purchases of chips B for household 1, which is in segment N, with the expected weekly purchases of chips B by households in segment N in the expected purchases table 400. If the weekly purchases and the corresponding expected purchases are similar or identical, the example opportunity metric corresponding to the product will be low. In contrast, if the weekly purchases of the product are lower than the expected purchases, the opportunity metric for that product with respect to that household will be high.

FIG. 6 is a table 600 illustrating an example advertising log for several households and several advertisements. The example table 600 may be maintained by the example media response evaluator 212 of FIG. 2 to evaluate the media response of different households 1-5 at the appropriate times. In the example table 600, the advertisements 1 and 2 represent broadcast advertisements that are shown to each of the households 1-5 during regular programming and advertising times, which may not be directly under the control of the content provider 106. In contrast, the example advertisement 3 is targeted at the households 1 and 4 using the example system(s) and/or method(s) disclosed herein in addition to being shown as part of regular broadcast programming to all households 1-5. The remaining advertisements 4-11 are targeted advertisements presented to the individual households 1-5 during advertising time owned by the content provider 106 and not presented as part of a blanket advertising campaign. Any number of advertisements and/or households may be stored in the example table 600 by the media response evaluator 212 and used to evaluate media response to advertisements presented to the households.

When evaluating the media responses according to the example table 600, the media response evaluator 212 considers saturation to begin after three presentations of a given advertisement. However, any statistically or otherwise determined number of presentations may be used. Thus, in the example of FIG. 6, when the media response evaluator 212 evaluates advertisements to be delivered to household 4, the media response evaluator 212 applies a penalty to advertisements 1, 2, and 9.

While an example manner of implementing the system 100 and the headend system 107 has been illustrated in FIGS. 1, 2 and/or 3A, one or more of the elements, processes and/or devices illustrated in FIGS. 1, 2 and/or 3A may be combined, divided, re-arranged, omitted, eliminated and/or implemented in any other way. Further, the example set top boxes 108 and/or 110, the example content provider 106, the example headend system 107, the example opportunity calculator 118, the example collaborative filter 126, the example advertisement selector 202, the example media deliverer 204, the example advertisement database 206, the example household selector 208, the example advertisement/programming selector 210, the example media response evaluator 212, the example pricing database 214, the example address database 216 and/or, more generally, the example system 100 may be implemented by hardware, software, firmware and/or any combination of hardware, software and/or firmware. Thus, for example, any of the example set top boxes 108 and/or 110, the example content provider 106, the example headend system 107, the example opportunity calculator 118, the example collaborative filter 126, the example advertisement selector 202, the example media deliverer 204, the example advertisement database 206, the example household selector 208, the example advertisement/programming selector 210, the example media response evaluator 212, the example pricing database 214, the example address database 216 and/or, more generally, the example system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example set top boxes 108 and/or 110, the example content provider 106, the example headend system 107, the example opportunity calculator 118, the example collaborative filter 126, the example advertisement selector 202, the example media deliverer 204, the example advertisement database 206, the example household selector 208, the example advertisement/programming selector 210, the example media response evaluator 212, the example pricing database 214, and/or the example address database 216 are hereby expressly defined to include a tangible medium such as a memory, DVD, CD, etc. storing the software and/or firmware. Further still, the example system 100 may include one or more elements, processes and/or devices in addition to, or instead of, those illustrated in FIGS. 1, 2, and/or 3, and/or may include more than one of any or all of the illustrated elements, processes and devices.

Figure 7:
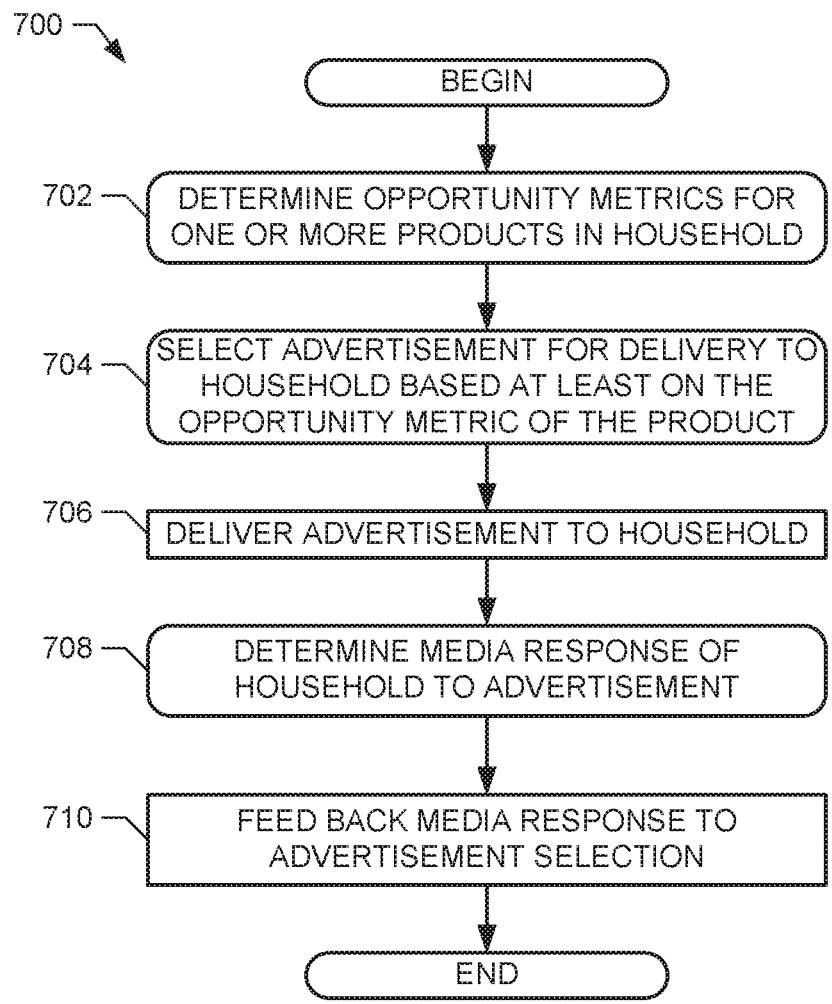
FIG. 7 is a flowchart representative of example machine readable instructions which may be executed to select targeted advertising for display.

FIG. 7 is a flowchart representative of example machine readable instructions 700 which may be executed to implement the example system 100 of FIGS. 1-3A. The example instructions 700 may be executed by, for example, the processor 1102 of FIG. 11 to implement the headend system 200 illustrated in FIG. 2 to deliver targeting advertising to individual households. In some examples, the instructions 700 may be executed separately for each household for which targeted advertising will be selected and delivered. The example instructions 700 begin by determining one or more opportunity metric(s) for one or more products for a household (e.g., the household A 102 or the household B 104 of FIG. 1) (block 702). An example process to implement block 702 is described in more detail below with reference to FIG. 8.

The headend system 200 (e.g., via the advertisement selector 202 of FIG. 2) selects an advertisement for display or presentation to the household based at least on the opportunity metric of the product associated with the advertisement (block 704). The selection of the advertisement may be based further on a pricing structure, an advertisement/programming association, and/or a saturation characteristic of the household with respect to different advertisements. An example process to implement block 704 is described in more detail below with reference to FIG. 9. The headend system 200 (e.g., via the media deliverer 204 of FIG. 2) delivers the selected advertisement to the household (block 706). The media deliverer 204 may deliver the selected advertisement during a time slot owned by the content provider 106. In some examples, the media deliverer 204 receives an address corresponding to a set top box (e.g., the set top box 108 in the household A 102 of FIG. 1) and transmits the advertisement to the address.

The headend system 200 (e.g., via the media response evaluator 212 of FIG. 2) then determines the media response of the household to the advertisement (block 708). For example, the media response evaluator 212 may determine that future presentations of the delivered advertisement are likely to exhibit decreased effectiveness because the household has been saturated with the advertisement. An example process to implement block 708 is described in more detail below with reference to FIG. 9. The media response evaluator 212 then feeds back the media response to the advertisement selector 202 (block 710). The advertisement selector 202 may use the media response in selecting future advertisements for delivery to the household (e.g., future iterations of block 704).

Figure 8:
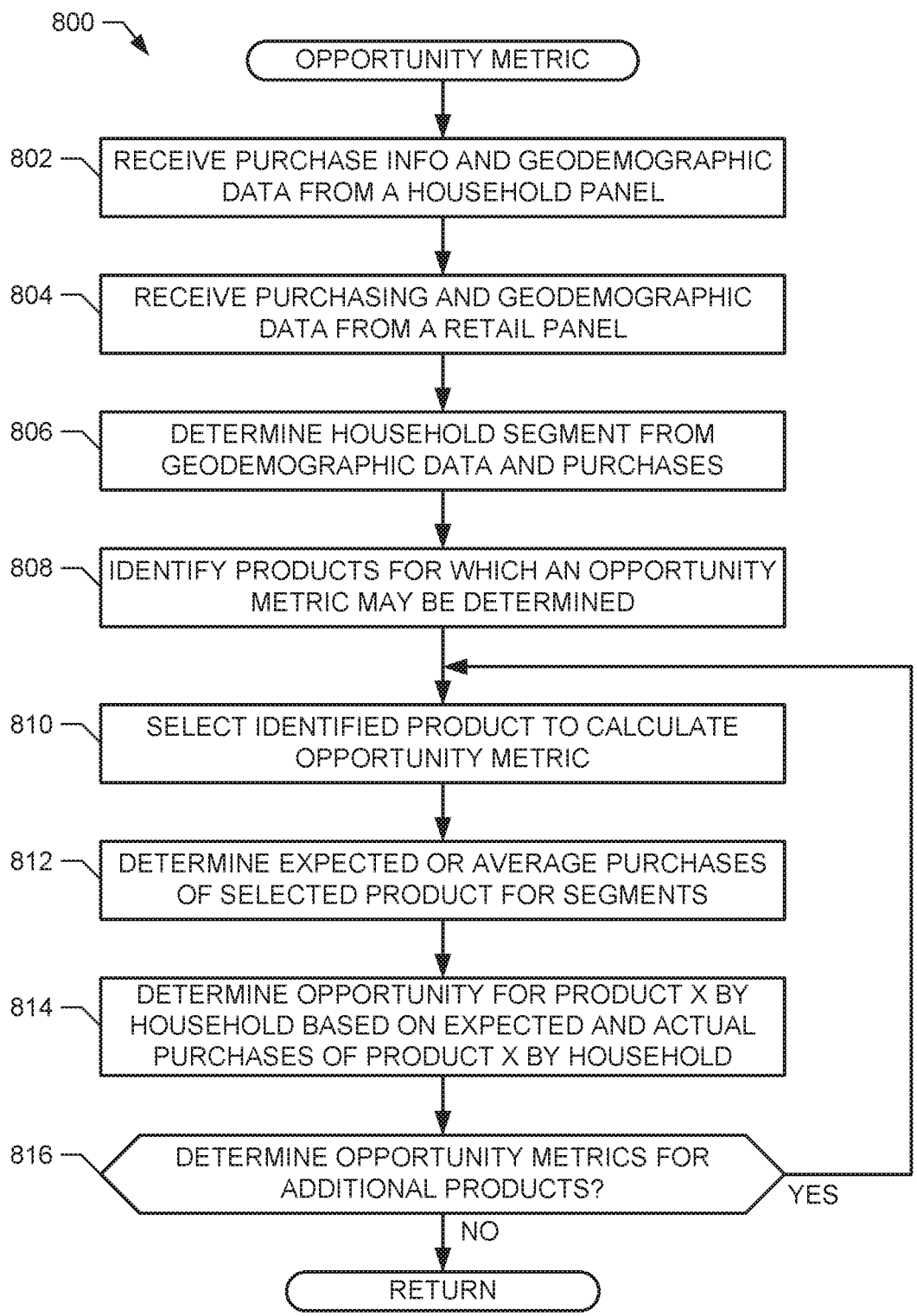
FIG. 8 is a flowchart representative of example machine readable instructions which may be executed to determine one or more opportunity metrics for a household.

FIG. 8 is a flowchart representative of example machine readable instructions 800 which may be executed to determine one or more opportunity metrics for a household. The example instructions 800 may be executed by, for example, the processor 1102 of FIG. 11 to implement the collaborative filter 126 of FIG. 3A and/or block 702 of FIG. 7.

The example collaborative filter 126 receives purchasing information (e.g., the purchasing information 302 of FIG. 3A) and geodemographic information (e.g., the geodemographic information 304 of FIG. 3A) from a household (e.g., the household A 102 of FIG. 3A) (block 802). The collaborative filter 126 further receives purchasing and geodemographic data from one or more retail panels (block 804). In some examples, block 804 may be accomplished by receiving aggregate and/or processed frequent shopper card purchase data representative of multiple retailers in a geographic area of interest. By receiving the aggregate data, the example collaborative filter 126 may receive data specific to the segment and/or geographic area to which the household A 102 belongs. The collaborative filter 126 determines the segment to which the household A 102 belongs based on the purchase information 302 and the geodemographic information 304 (block 806). In some examples, the segments are determined based on the purchase information 302, the geodemographic information 304, and/or the data received from retail panels. Alternatively, the segments may be predetermined by an outside provider. The collaborative filter 126 may use additional and/or alternative data to determine the household segment.

The collaborative filter 126 then identifies products for which an opportunity metric may be calculated (block 808). Products identified by the collaborative filter 126 may include products purchased by the household A 102 and/or complements to such products. For example, the collaborative filter 126 may determine, based on the purchase data from different points of sale, that particular products purchased by the household A 102 have popular substitutes and/or complementary products. For instance, the collaborative filter 126 may determine that, based on the points of sale data, purchasers who purchase a particular brand of potato chips also tend to purchase a particular brand or flavor of chip dip as a complementary item. Similarly, the collaborative filter 126 may determine that purchasers who buy combinations of certain cereals and candy also tend to purchase a particular brand of flavored drink mix.

The collaborative filter 126 selects one of the products identified in block 808 to determine an opportunity metric for the product with respect to the household A 102 (block 810). Based on the points of sale data and the segment of the household A 102, the collaborative filter 126 determines the expected and/or average purchases of the selected product for the household A 102 and/or the segment to which the household A 102 belongs (block 812). Based on the expected and/or average purchases of the selected product and the current purchases of the selected product by the household A 102, the collaborative filter 126 determines the opportunity metric for the selected product in the selected household A 102 (block 814). The opportunity metric is based on the difference between the expected purchases (e.g., weekly) by the household A 102 and the actual purchases by the household A 102.

The collaborative filter 126 then determines whether there are additional identified products for which an opportunity metric must be generated (block 816). If there are additional products (block 816), control returns to block 810 to select another identified product. Blocks 810-816 iterate to determine opportunity metric(s) for the products identified in block 808. When there are no more products for which an opportunity metric is to be generated (block 816), control returns to block 704 of FIG. 7.

Figure 9:
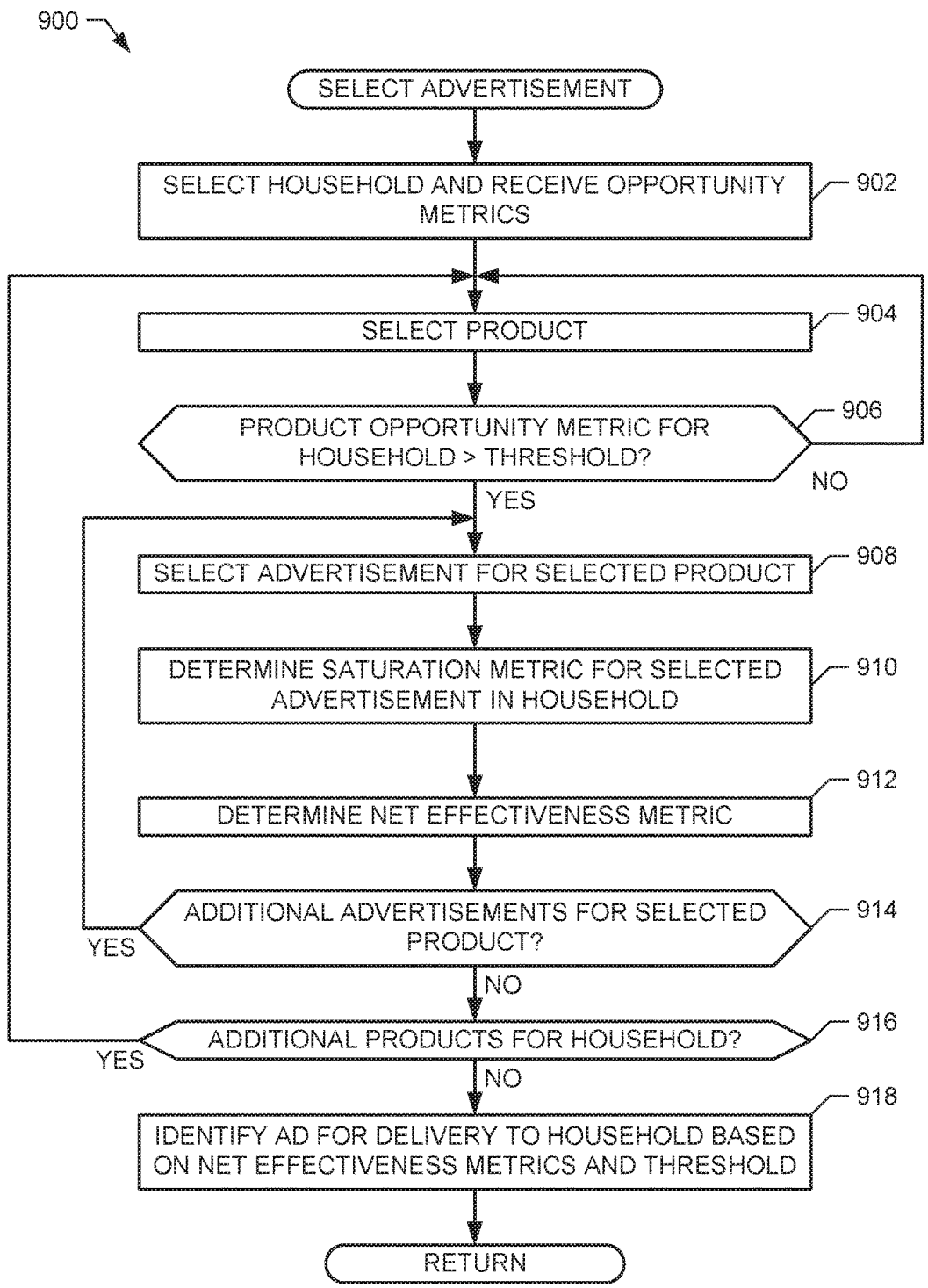
FIG. 9 is a flowchart representative of example machine readable instructions which may be executed to select an advertisement for delivery to a household.

FIG. 9 is a flowchart representative of example machine readable instructions 900 which may be executed to select an advertisement for delivery to a household. The example instructions 900 may be executed by, for example, the processor 1102 of FIG. 11 to implement advertisement selector 202 of FIG. 2 and/or block 704 of FIG. 7.

The advertisement selector 202 first selects a household and receives opportunity metric information for the household A 102 (e.g., the household A 102 of FIG. 1) (block 902). The household A 102 may be selected based on opportunity metric information received from, for example, the collaborative filter 126. The advertisement selector 202 selects a first product from the opportunity metrics associated with the household A 102 (block 904). For example, the advertisement selector 202 may select the product having the highest opportunity metric with respect to the household A 102 or may select a product at random from a list of products for which an opportunity metric is provided.

The advertisement selector 202 then determines whether the opportunity metric associated with the selected product is greater than a threshold (block 906). If the opportunity is not greater than the threshold (block 906), control returns to block 904 to select another product. If the opportunity metric for the selected product is greater than the threshold (block 906), the advertisement selector 202 selects an advertisement associated with the selected product (block 908). For example, the advertisement selector 202 may select an advertisement associated with the product from the advertisement database 206 of FIG. 2. In some examples, the advertisement database 206 includes multiple advertisements associated with a particular product and the advertisement selector 202 picks between the same as explained below.

The advertisement selector 202 determines the saturation of the household A 102 with respect to the selected advertisement (block 910). For example, the advertisement selector 202 may have previously received a count or other indication of a number of times that the selected advertisement has been presented to the household A 102. Presentation of the advertisement to the household A 102 may be counted as a result of general broadcast advertising and/or targeted advertising using the systems and methods disclosed herein. Thus, the system 100 of FIG. 1 preferably includes an audience measurement system that monitors media exposure in the household in order to count advertisement exposure through general broadcasts. Such an audience measurement systems may be any type of system such as the system(s) employed by the Nielsen Company, LLC, to develop television ratings and/or to perform advertisement broadcast monitoring (e.g., the Monitor-Plus® system).

Based on the collected data for the household A 102 and/or extrapolation to the household A 102 if the household A 102 is not directly monitored by an audience measurement system, the advertisement selector 202 determines a net effectiveness metric for the selected advertisement to represent the saturation of the household A 102 (block 912). For example, if using discrete saturation levels, the advertisement selector 202 may apply a penalty to the advertisement (e.g., subtract the saturation metric from the corresponding product opportunity metric) using a function of the number of times the selected advertisement has been shown (or is estimated to have been shown) to the household A 102 and the number of times that an advertisement must be shown to the household A 102 before saturation begins. If the advertisement uses binary saturation levels, the advertisement selector 202 may apply a high penalty to (e.g., disqualify) an advertisement to which the household A 102 is saturated and apply no penalty to an advertisement to which the household A 102 is not saturated. The penalty may be applied by subtracting a value associated with the penalty from the corresponding opportunity metric for the product in question.

After determining the saturation metric and the net effectiveness metric, the advertisement selector 202 determines whether the net effectiveness metric (i.e., the opportunity metric as modified by the penalty) is sufficiently high for the advertisement to overcome the saturation of the household A 102 (block 914). For example, the advertisement selector 202 may determine if the net effectiveness metric for the advertisement is the highest net effectiveness metric calculated for the household A 102. If the opportunity for a product is still sufficiently high at the household A 102, the net effectiveness metric is sufficiently high and the selected advertisement may still influence purchasing decisions despite having been presented to the household A 102 a number of times.

After determining the net effectiveness metric, the advertisement selector 202 determines whether there are additional advertisements that may be selected for the selected product (block 914). In some examples, a first advertisement for a selected product may have reached saturation at the household A 102, but a second advertisement for the selected product has not yet reached saturation. If there are additional advertisements available for the selected product (block 914), control returns to block 908 to select another advertisement for the selected product. In contrast, if there are no additional advertisements available (block 914), the advertisement selector 202 determines whether there are additional products for which an opportunity metric is available (block 916).

If, at block 916, there are no additional products, the advertisement selector 202 identifies an advertisement for a product, based on the net effectiveness metrics and one or more thresholds, to the media deliverer 204 for transmission to the selected household A 102 (block 918). For example, the advertisement selector 202 may identify one or more advertisements that have a net effectiveness metric greater than a threshold. In contrast, if one or more advertisements are less than the threshold, they may not be identified as acceptable for delivery to the household A 102. In some examples, the threshold is based on the reach, the lower limit of effectiveness desired by an advertiser, and/or other factors that may be defined in an advertising agreement. When the advertisement selector 202 has identified an advertisement for the selected household A 102 (block 918), the instructions 900 may end and control returns to block 706 of FIG. 7.

Figure 10:
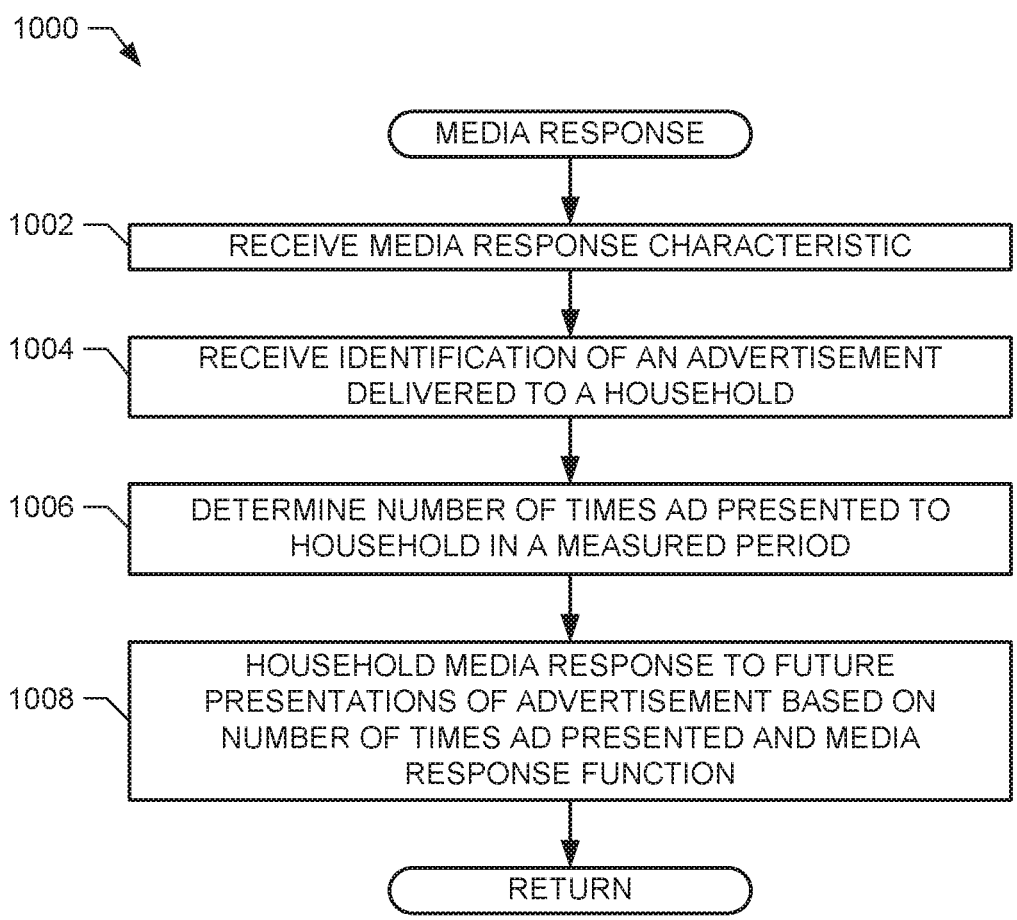
FIG. 10 is a flowchart representative of example machine readable instructions which may be executed to determine a media response of a household to a displayed advertisement.

FIG. 10 is a flowchart representative of example machine readable instructions 1000 which may be executed to determine a media response of a household to a delivered advertisement. The example instructions 1000 may be executed by, for example, the processor 1102 of FIG. 11 to implement the media response evaluator 212 of FIG. 2.

The media evaluator 212 receives a media response characteristic from, for example, a media research organization or other media response characteristic provider (block 1002). In some examples, the media response characteristic is determined by statistical models that describe the effectiveness of an advertisement per presentation as a characteristic of the number of times that the advertisement is presented to a given person. In some models, as the number of times the advertisement is shown to a household increases, the effectiveness of each additional showing decreases (e.g., f(n)~1/n, where f(n) is the effectiveness of the next presentation and n is the total number of presentations) and/or the overall effectiveness of all presentations of the advertisement flattens out (e.g., t(n)~log(n), where t(n) is the total effectiveness of all presentations and n is the total number of presentations). However, in some other models such as the example advertisement saturation characteristic 324 of FIG. 3B, the effectiveness f(n) resembles an S-shaped curve where the greatest effectiveness lies after the first presentation of an advertisement.

In some examples, the media evaluator 212 deduces a media response characteristic of the household A 102 based on the changing purchases of the household A 102, the advertisements presented to the household A 102, the segment of the household A 102, and/or the media response characteristic of the segment of the household A 102. For example, some households may respond to advertising more readily and saturate with respect to a given advertisement more quickly than average. Thus, it may be desirable to avoid repeating advertisements to such households very often, and new advertisements could potentially command a higher price for presentation than repeated advertisements. In contrast, some households may be less prone to saturation with respect to any given advertisement than average. In such a case, the media evaluator 212 may penalize advertisements less than for typical households for the same number of presentations.

The media evaluator 212 receives an identification of an advertisement delivered to the household A 102 (block 1004). For example, the media evaluator 212 may be notified via metadata that an advertisement was delivered to the household A 102 at a particular time. The media evaluator 212 determines the number of times the advertisement has been shown to the household A 102 in a measured period (e.g., one day, one week, two weeks, one month, etc.) (block 1006). Based on the number of times the advertisement has been shown (e.g., including the most recent presentation) and the media response characteristic, the media evaluator 212 determines a media response value of the household A 102 to future presentations of the advertisement (block 1008). The media response values may be stored for future reference by the advertisement selector 202. In some examples, the media evaluator 212 only determines the household media response on demand when the advertisement selector 202 selects an advertisement for potential delivery based on a product with a high opportunity metric. In such examples, the media evaluator 212 sends the future response to the advertisement selector 202. When the media evaluator 212 has predicted the future response, the example instructions 1000 end and control returns to block 710 of FIG. 7.

Figure 11:
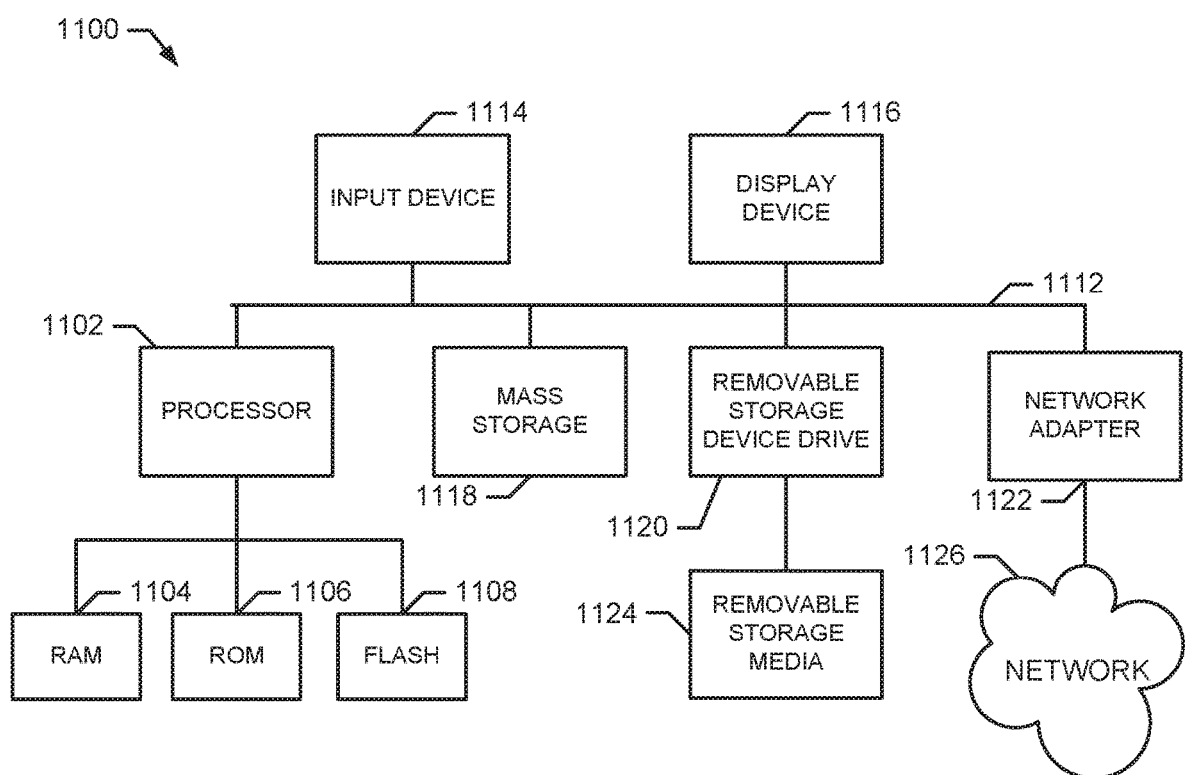
FIG. 11 is a diagram of an example processor system that may be used to execute the example instructions of FIGS. 7, 8, 9, and 10 to implement the example systems of FIGS. 1 and 2.

FIG. 11 is a diagram of an example processor system 1100 that may be used to execute the example machine readable instructions 700, 800, 900, and/or 1000 described in FIGS. 7-10, as well as to implement the system 100 of FIGS. 1-3A and the headend system 200 described in FIG. 2. The example processor system 1100 includes a processor 1102 having associated memories, such as a random access memory (RAM) 1104, a read only memory (ROM) 1106 and a flash memory 1108. The processor 1102 in communication with an interface, such as a bus 1112 to which other components may be interfaced. In the illustrated example, the components interfaced to the bus 1112 include an input device 1114, a display device 1116, a mass storage device 1118, a removable storage device drive 1120, and a network adapter 1122. The removable storage device drive 1120 may include associated removable storage media 1124 such as magnetic or optical media. The network adapter 1122 may connect the processor system 1100 to an external network 1126.

The example processor system 1100 may be, for example, a desktop personal computer, a notebook computer, a workstation or any other computing device. The processor 1102 may be any type of logic device, such as a microprocessor from the Intel® Pentium® family of microprocessors, the Intel® Itanium® family of microprocessors, and/or the Intel XScale® family of processors. The memories 1104, 1106 and 1108 that are in communication with the processor 1102 may be any suitable memory devices and may be sized to fit the storage demands of the system 1100. In particular, the flash memory 1108 may be a non-volatile memory that is accessed and erased on a block-by-block basis.

The input device 1114 may be implemented using a keyboard, a mouse, a touch screen, a track pad, a barcode scanner or any other device that enables a user to provide information to the processor 1102.

The display device 1116 may be, for example, a liquid crystal display (LCD) monitor, a cathode ray tube (CRT) monitor or any other suitable device that acts as an interface between the processor 1102 and a user. The display device 1116 includes any additional hardware required to interface a display screen to the processor 1102.

The mass storage device 1118 may be, for example, a hard drive or any other magnetic, optical, or solid state media that is readable by the processor 1102.

The removable storage device drive 1120 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive and/or a solid state universal serial bus (USB) storage drive. The removable storage media 1124 is complimentary to the removable storage device drive 1120, inasmuch as the media 1124 is selected to operate with the drive 1120. For example, if the removable storage device drive 1120 is an optical drive, the removable storage media 1124 may be a CD-R disk, a CD-RW disk, a DVD disk or any other suitable optical disk. On the other hand, if the removable storage device drive 1120 is a magnetic media device, the removable storage media 1124 may be, for example, a diskette or any other suitable magnetic storage media.

The network adapter 1122 may be, for example, an Ethernet adapter, a wireless local area network (LAN) adapter, a telephony modem, or any other device that allows the processor system 1100 to communicate with one or more other processor systems over a network. The external network 1126 may be a LAN, a wide area network (WAN), a wireless network, or any type of network capable of communicating with the processor system 1100. Example networks may include the Internet, an intranet, and/or an ad hoc network.

Although this patent discloses example systems including software or firmware executed on hardware, it should be noted that such systems are merely illustrative and should not be considered as limiting. For example, it is contemplated that any or all of these hardware and software components could be implemented exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A media provider headend system comprising:
memory including machine readable instructions; and
a processor to execute the instructions to at least:
- access an address of a media device associated with a first household;
- access first purchase data reported from a logging device that is to log product purchase activity at the first household;
- determine a consumer segment associated with the first household;
- determine, based on the first purchase data, an actual quantity of a first product purchased by the first household during a first period of time;
- estimate, based on second purchase data associated with a plurality of consumers included in the consumer segment associated with the first household, an estimated quantity of the first product to be purchased by the first household during the first period of time;
- determine an opportunity metric for the first product based on the actual quantity of the first product purchased by the first household during the first period of time and the estimated quantity of the first product to be purchased by the first household during the first period of time;
- select a first advertisement associated with the first product to deliver to the media device based on the opportunity metric and a saturation metric associated with the first household for the first advertisement, the saturation metric determined based on detection of identification codes embedded in prior transmissions of the first advertisement to the media device; and
- transmit the first advertisement to the address of the media device.

2. The media provider headend system of claim 1, wherein the media device corresponds to a set top box, and the address corresponds to at least one a media access control address or an Internet protocol address.

3. The media provider headend system of claim 1, wherein the processor is to determine the consumer segment associated with the first household based on demographic data obtained for the first household.

4. The media provider headend system of claim 1, wherein the processor is to determine the opportunity metric based on a difference between the estimated quantity and the actual quantity.

5. The media provider headend system of claim 1, wherein the opportunity metric is a first opportunity metric, and the processor is to:
- access point-of-sale data to identify a second product associated with the first product; and
- determine a second opportunity metric for the second product to be purchased by the first household based on the first purchase data reported from the logging device and the second purchase data associated with the plurality of consumers included in the consumer segment.

6. The media provider headend system of claim 1, wherein to select the first advertisement, the processor is to:
- determine the saturation metric based on a number of the prior transmissions of the first advertisement received by the media device;
- adjust the opportunity metric based on the saturation metric to determine an effectiveness metric for the first advertisement; and
- select the first advertisement when the effectiveness metric satisfies a threshold.

7. The media provider headend system of claim 6, wherein to determine the effectiveness metric, the processor is to subtract the saturation metric from the opportunity metric.

8. A storage device or storage disk comprising machine readable instructions that, when executed, cause a processor to at least:
- access an address of a media device associated with a first household;
- access first purchase data reported from a logging device that is to log product purchase activity at the first household;
- determine a consumer segment associated with the first household;
- determine, based on the first purchase data, an actual quantity of a first product purchased by the first household during a first period of time;
- estimate, based on second purchase data associated with a plurality of consumers included in the consumer segment associated with the first household, an estimated quantity of the first product to be purchased by the first household during the first period of time;
- determine an opportunity metric for the first product based on the actual quantity of the first product purchased by the first household during the first period of time and the estimated quantity of the first product to be purchased by the first household during the first period of time;
- select a first advertisement associated with the first product to deliver to the media device based on the opportunity metric and a saturation metric associated with the first household for the first advertisement, the saturation metric determined based on detection of identification codes embedded in prior transmissions of the first advertisement to the media device; and
- transmit the first advertisement to the address of the media device.

9. The storage device or storage disk of claim 8, wherein the media device corresponds to a set top box, and the address corresponds to at least one a media access control address or an Internet protocol address.

10. The storage device or storage disk of claim 8, wherein the instructions, when executed, cause the processor to determine the consumer segment associated with the first household based on demographic data obtained for the first household.

11. The storage device or storage disk of claim 8, wherein the instructions, when executed, cause the processor to determine the opportunity metric based on a difference between the estimated quantity and the actual quantity.

12. The storage device or storage disk of claim 8, wherein the opportunity metric is a first opportunity metric, and the instructions, when executed, cause the processor to:
- access point-of-sale data to identify a second product associated with the first product; and
- determine a second opportunity metric for the second product to be purchased by the first household based on the first purchase data reported from the logging device and the second purchase data associated with the plurality of consumers included in the consumer segment.

13. The storage device or storage disk of claim 8, wherein the instructions, when executed, cause the processor to select the first advertisement by:
  determining the saturation metric based on a number of the prior transmissions of the first advertisement received by the media device;
  adjusting the opportunity metric based on the saturation metric to determine an effectiveness metric for the first advertisement; and
  selecting the first advertisement when the effectiveness metric satisfies a threshold.

14. The storage device or storage disk of claim 13, wherein the instructions, when executed, cause the processor to subtract the saturation metric from the opportunity metric to determine the effectiveness metric.

15. A method comprising:
  accessing an address of a media device associated with a first household;
  accessing first purchase data reported from a logging device that is to log product purchase activity at the first household;
  determining, by executing an instruction with a processor, a consumer segment associated with the first household;
  determining, by executing an instruction with the processor, and based on the first purchase data, an actual quantity of a first product purchased by the first household during a first period of time;
  estimating, by executing an instruction with the processor, and based on second purchase data associated with a plurality of consumers included in the consumer segment associated with the first household, an estimated quantity of the first product to be purchased by the first household during the first period of time;
  determining, by executing an instruction with the processor, an opportunity metric for the first product based on the actual quantity of the first product purchased by the first household during the first period of time and the estimated quantity of the first product to be purchased by the first household during the first period of time;
  selecting, by executing an instruction with the processor, a first advertisement associated with the first product to deliver to the media device based on the opportunity metric and a saturation metric associated with the first household for the first advertisement, the saturation metric determined based on detection of identification codes embedded in prior transmissions of the first advertisement to the media device; and
  transmitting the first advertisement to the address of the media device.

16. The method of claim 15, wherein the media device corresponds to a set top box, and the address corresponds to at least one a media access control address or an Internet protocol address.

17. The method of claim 15, further including determining the consumer segment associated with the first household based on demographic data obtained for the first household.

18. The method of claim 15, wherein the determining of the opportunity metric includes determining the opportunity metric based on a difference between the estimated quantity and the actual quantity.

19. The method of claim 15, wherein the opportunity metric is a first opportunity metric, and further including:
  accessing point-of-sale data to identify a second product associated with the first product; and
  determining a second opportunity metric for the second product to be purchased by the first household based on the first purchase data reported from the logging device and the second purchase data associated with the plurality of consumers included in the consumer segment.

20. The method of claim 15, wherein the selecting of the first advertisement includes:
  determining the saturation metric based on a number of the prior transmissions of the first advertisement received by the media device;
  adjusting the opportunity metric based on the saturation metric to determine an effectiveness metric for the first advertisement; and
  selecting the first advertisement when the effectiveness metric satisfies a threshold.

21. The method of claim 20, wherein the adjusting of the opportunity metric based on the saturation metric to determine the effectiveness metric includes subtracting the saturation metric from the opportunity metric to determine the effectiveness metric.

* * * * *